United States Patent [19]

Rupp et al.

[11] Patent Number: 4,822,862

[45] Date of Patent: Apr. 18, 1989

[54] EMULSION POLYMERIZATION OF 4-ACETOXYSTYRENE AND HYDROLYSIS TO POLY(P-VINYLPHENOL)

[75] Inventors: Raymond W. Rupp; Donna L. Keene, both of Corpus Christi, Tex.

[73] Assignee: Hoechst Celanese Corporation, Somerville, N.J.

[21] Appl. No.: 231,590

[22] Filed: Aug. 8, 1988

Related U.S. Application Data

[63] Continuation of Ser. No. 7,541, Jan. 28, 1987, abandoned.

[51] Int. Cl.$^4$ ................................................ C08F 8/10
[52] U.S. Cl. ................................ 525/367; 525/328.9; 525/369; 525/378
[58] Field of Search ...................... 525/328.9, 367, 369, 525/378

[56] References Cited

U.S. PATENT DOCUMENTS

| | | | |
|---|---|---|---|
| 3,970,534 | 7/1976 | Fujiwara et al. | 525/298 |
| 4,129,617 | 12/1978 | Machi et al. | 525/302 |
| 4,678,843 | 7/1987 | Elmore et al. | 525/378 |
| 4,689,371 | 8/1987 | Elmore et al. | 525/329.5 |

*Primary Examiner*—Joseph L. Schofer
*Assistant Examiner*—Bernard Lipman
*Attorney, Agent, or Firm*—Herb P. Price; Herbert M. Hanegan; Donald R. Cassady

[57] ABSTRACT

4-Acetoxystyrene is homopolymerized and copolymerized in aqueous emulsion and, without isolation, the polymer is hydrolyzed to homopolymers and copolymers of p-vinylphenol with a base. Homopolymers and copolymers of p-vinylphenol are used as epoxy resin curing agents and in the preparation of epoxy resins by reaction with epichlorohydrin.

15 Claims, No Drawings

EMULSION POLYMERIZATION OF 4-ACETOXYSTYRENE AND HYDROLYSIS TO POLY(P-VINYLPHENOL)

This is a continuation of co-pending application Ser. No. 7,541 filed on 1-28-87, now abandoned.

BACKGROUND OF INVENTION

The field of art to which this invention pertains is homopolymers and copolymers of vinylphenol.

Homopolymers and copolymers of 4-hydroxystyrene, or p-vinylphenol as it is also called, are known compositions which have many uses, such as in the manufacture of metal treatment compositions, epoxy resins, epoxy resin curing agents and photoresists. Polymers of p-vinylphenol can be made by polymerizing p-vinylphenol itself. However, p-vinylphenol is an unstable compound and must be refrigerated to prevent it from polymerizing spontaneously. Even under refrigeration, the monomer will slowly polymerize to low molecular weight polymers. 4-Acetoxystyrene, the acetic acid ester of p-vinylphenol, is a stable monomer which can be readily homopolymerized and copolymerized to low, medium and high molecular weight polymers. After polymerization, the phenolic ester group can be hydrolyzed to produced p-vinylphenol polymers.

Corson et. al., Journal of Organic Chemistry, 23, 544–549 (1958), describe a 5 step process for making p-vinylphenol from phenol. The phenol is first acetylated to p-hydroxyacetophenone which is then acetylated to p-acetoxyacetophenone. This compound is hydrogenated to p-acetoxyphenylmethylcarbinol which is then dehydrated to p-acetoxystyrene. The p-acetoxystyrene is saponified to p-vinylphenol using potassium hydroxide.

The ester interchange reaction of poly(4-acetoxystyrene) in methanol using sodium methylate is described in U.S. Pat. No. 2,276,138. About 84 percent of the acetate groups are removed by the interchange reaction. Packham, in the Journal of the Chemical Society, 1964, 2617–2624, describes the hydrolysis of crosslinked poly(4-hydroxystyrene) by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethylammonium chloride as a phase transfer agent. Arshady et. al., Journal of Polymer Science, 12, 2017–2025 (1974), hydrolyzed copolymers of styrene and acetoxystyrene to the vinylphenol polymer using hydrazine hydrate in dioxane.

SUMMARY OF INVENTION

This invention pertains to a process for preparing homopolymers and copolymers of p-vinylphenol. In one aspect, the invention relates to the aqueous emulsion polymerization of 4-acetoxystyrene. In another aspect, the invention pertains to the hydrolysis of the homopolymers and copolymers of 4-acetoxystyrene to homopolymers and copolymers of p-vinylphenol.

By the process of this invention, 4-acetoxystyrene with or without other monomers is emulsified in water in the presence of an anionic or a nonionic surfactant and is polymerized to homopolymers or copolymers of 4-acetoxystyrene using free radical polymerization catalysts. Without isolation, the polymer is then hydrolyzed to homopolymers or copolymers of p-vinylphenol with a base, such as an alkali metal hydroxide or ammonium hydroxide.

DETAILED DESCRIPTION OF THE INVENTION

4-Acetoxystyrene will homopolymerize readily in the same manner that styrene homopolymerizes and can also be copolymerized with styrene and with monomers which are copolymerizable with styrene. Examples of comonomers in addition to styrene are vinyltoluene, alpha-methylstyrene, ortho-, meta- and para-, chloro- and bromostyrene, the diene monomers, such as butadiene, and the acrylates and methacrylate ester monomers, such as methyl acrylate, methyl methacrylate, ethyl acrylate, butyl acrylate, butyl methacrylate, and 2-ethylhexyl acrylate. Additional monomers include acrylonitrile, methacrylonitrile and the polymerizable acids, such as acrylic acid, methacrylic acid, maleic anhydride, maleic acid, fumaric acid and the like.

Useful copolymers contain about 1 to about 99 parts by weight of 4-acetoxystyrene to about 99 to about 1 parts of monomer copolymerizable therewith. Preferred copolymers contain about 25 to about 75 parts by weight of 4-acetoxystyrene to about 75 to about 25 parts by weight of monomer copolymerizable therewith. Particularly preferred copolymers are those made from about 10 to about 50 parts by weight of 4-acetoxystyrene to about 90 to about 50 parts by weight of monomer copolymerizable therewith.

In carrying out the process of this invention, the 4-acetoxystyrene with or without comonomers is emulsified in water at a monomer content in the water of about 20 to about 60 weight percent. The monomers are emulsified in the water using anionic or nonionic surfactants. Examples of useful anionic surfactants are the higher molecular weight sulfates and sulfonates, e.g., sodium and potassium alkyl, aryl and alkylaryl sulfates and sulfonates, such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfate, potassium methylbenzene sulfonate, sodium dodecyl benzene sulfate, potassium toluene sulfonate, and sodium xylene sulfonate; higher fatter alcohols, e.g., stearyl, lauryl, etc., which have been ethoxylated and sulfonated; dialkyl esters of alkali metal sulfosuccinic acid salts, such as sodium diamyl sulfosuccinate, sodium dioctyl sulfosuccinate, and formaldehyde-naphthalene sulfonic acid condensation products.

Examples of nonionic surfactants which can be used in this invention are polyethers, e.g., ethylene oxide and propylene oxide condensates which include straight and branched chain alkyl and alkylaryl polyethylene glycol and polypropylene glycol ethers and thioethers; alkylphenoxypoly(ethyleneoxy)ethanols having alkyl groups containing from about 7 to about 18 carbon atoms and having from about 4 to about 240 ethyleneoxy units, such as heptylphenoxypoly(ethyleneoxy)ethanols, nonylphenoxypoly(ethyleneoxy)ethanols and dodecylphenoxypoly(ethyleneoxy)ethanols; the polyoxyalkylene derivatives of hexitol (including sorbitans, sorbides, mannitans and mannides); partial long change fatty acid esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, said base being formed by condensing propylene oxide with propylene glycol;

sulfur containing condensates, e.g., those prepared by condensing ethylene oxide with higher alkyl mercaptans, such as nonyl, dodecyl or tetradecyl mercaptan, or with alkylthiophenols wherein the alkyl group contains from about 6 to about 15 carbon atoms; ethylene oxide derivatives of long chain carboxylic acids, such as lauric, myristic, palmitic, or oleic acids or mixtures of acids, such as tall oil fatty acids; and ethylene oxide derivatives of long chain alcohols such as octyl, decyl, lauryl, or cetyl alcohols.

The amounts of surfactant employed in the emulsion polymerization process will range from about 0.02 to about 10 weight percent, preferably about 0.2 to about 5 weight percent based on the total weight of monomers and water. Mixtures of anionic and nonionic surfactants can be used. The preferred surfactants are anionic surfactants.

In addition to the surfactants, the emulsion polymerization system can also contain protective colloids. Examples of protective colloids are ether linkage-containing protective colloids, such as hydroxymethyl cellulose, hydroxyethyl cellulose, ethylhydroxyethyl cellulose, carboxymethyl cellulose, ethoxylated starch derivatives and the like. Other protective colloid substances can also be used either alone or together with the ether linkage containing materials. Other such protective colloids include partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starch, glue, gelatin, water soluble alginates, such as sodium or potassium alginate, casein, agar and natural and synthetic gums, such as guar, gum arabic and gum tragacanth. The protective colloids can be used in the amounts ranging from about 0.1 weight percent to about 2 weight percent based on the total weight of the polymer emulsion.

The acetoxystyrene monomer with or without comonomers is polymerized by means of a catalytic amount of a conventional free radical polymerization catalyst or catalyst system (which can also be referred to as an addition polymerization catalyst, a vinyl polymerization catalyst, or a polymerization initiator), preferably, although not necessarily, one which is substantially water soluble. Among such catalysts are peroxides, such as hydrogen peroxide, tertiary butyl hydroperoxide, cumene hydroperoxide, alkali metal (i.e., sodium, potassium, or lithium) and ammonia persulfates, perphosphates, and perborates; azo nitriles, such as alpha, alpha-azobisisobutyronitrile, and redox system including such combinations as mixtures of hydrogen peroxide, t-butyl hydroperoxide or the like and any of the iron salts, titanous salts, zinc formaldehyde sulfoxylate, or sodium formaldehyde sulfoxylate; an alkali metal or ammonium persulfate, perborate or perchlorate together with an alkali metal bisulfite, such as sodium metabisulfite; an alkali metal persulfate together with an aryl phosphinic acid, such as benzene phosphinic acid and the like.

In accordance with the customary practice of the art, the amount of polymerization catalyst employed will be no more than that required to obtain substantially complete monomer conversion at lower catalyst cost. The amount of catalyst will generally vary from about 0.1 to about 1 percent by weight based on the weight of monomer.

The emulsification and polymerization reaction can be conducted by any of the well known procedures which are used to prepare emulsion polymers. For instance, the monomers, catalysts, surfactants, protective colloids if used, and chain transfer agents, e.g., alkyl mercaptans, if used, can all be added to the reactor, and the reaction with suitable agitation to obtain emulsification can be conducted at a temperature of about 30° C. to about 95° C. until the polymerization is complete.

Alternatively, the reaction can be conducted by adding water, surfactants, and protective colloids, if used, into the reactor, raising the temperature, to the reaction temperature and then adding the monomer and a solution of the catalyst to the reactor under agitation. Still another method is to pre-emulsify the monomers in a portion of the water and a portion of the surfactant along with catalyst, and to add the pre-emulsion to the reactor which contains the remaining water and surfactant.

When the polymerization reaction is completed, the acetoxy groups on the polymer are hydrolyzed to phenolic groups using a base, such as an alkali metal hydroxide, ammonium hydroxide, a quaternary ammonium hydroxide, or a water soluble amine. Examples of quaternary ammonium bases are tetramethylammonium hydroxide, tetraethylammonium hydroxide, trimethylethylammonium hydroxide, diethyldimethylammonium hydroxide, benzyltrimethylammonium hydroxide and the like. Examples of water-soluble amines are methylamine, dimethylamine, ethylamine, diethylamine, benzylmethylamine, and the like.

When the base used in the hydrolysis reaction is an alkali metal hydroxide, i.e., sodium or potassium hydroxide, it is added to the emulsion as an aqueous solution at a concentration of about 10 to about 50 weight percent in water. The amount of alkali metal hydroxide used is about twice the equivalents of acetoxy groups that are to be hydrolyzed. If complete hydrolysis is desired, then two moles of sodium or potassium hydroxide are added for each molar equivalent of acetoxystyrene in the emulsion polymer. If less than complete hydrolysis is desired, then less alkali metal hydroxide is used but still on the basis of 2 equivalents for each equivalent of acetoxystyrene to be hydrolyzed.

When ammonium hydroxide is the base used in the hydrolysis reaction, it is added to the emulsion at a concentration of about 20 to about 30 weight percent in water. Ammonium hydroxide is added to the emulsion on the same equivalent basis as the alkali metal hydroxide, i.e., two moles of ammonium hydroxide for each molar equivalent of acetoxystyrene that is to be hydrolyzed. Quaternary ammonium bases and water-soluble amines can be added neat or as aqueous solutions.

After adding the base, the emulsion is heated at about 30° C. to about 95° C., preferably about 60° C. to about 90° C., until the desired amount of hydrolysis is obtained. Generally, the time will be from about 2 hours to about 10 hours.

When the hydrolysis reaction is completed, the resulting vinylphenol polymer can be recovered by any of the well known methods. For instance, the reaction mass is acidified and the solid polymer is recovered by filtration, followed by washing and drying. The polymer can also be recovered by coagulating the emulsion with alum and, after acidification, recovering the solid polymer which is then washed and dried.

The vinylphenol polymers obtained by this invention can be converted to epoxide containing polymers by reacting the phenolic groups with epichlorohydrin using well known epoxide resin technology. The polymers can also be used as epoxy resin curing agents.

Other uses for the polymers are the corrosion treatment of metals and in the manufacture photoresist compositions.

The following examples explain this invention in more detail. Parts and percentages are parts and percentages by weight unless otherwise indicated.

EXAMPLE 1

To a suitable reactor are added 55 parts of deionized water and 0.5 part of sodium lauryl sulfate. Agitation is begun and the temperature is adjusted to 75° C. 4-Acetoxystyrene monomer, 20 parts, is then added. After five minutes while keeping the temperature at 75° C., a solution of 0.05 part of potassium persulfate in 5 parts of water is added. Heating is then continued for four hours at 75° C. to complete the polymerization reaction. A solution of 6.9 parts of sodium hydroxide dissolved in 10 parts of water is then added while keeping the temperature at 75° C. After 30 minutes heating, 100 parts of water are added to reduce the viscosity of the reactants. After an additional 30 minutes heating, 200 parts of water are added. After heating at 75° C. for 3 hours, the temperature of the reactants is lowered to room temperature and the pH is adjusted to 3 using dilute hydrochloric acid. The reaction mass is then filtered and washed well with water and is dried yielding a white solid in the amount of 13.4 parts. The acetoxy groups of the polymer are substantially hydrolyzed to phenolic groups as indicated by infrared analysis.

EXAMPLE 2

Using the same procedure described in Example 1, 20 parts of 4-acetoxystyrene are emulsion polymerized in 55 parts of water and 0.5 part of sodium lauryl sulfate using as catalyst a solution of 0.5 part of potassium persulfate in 5 parts of water. After heating for 4 hours at 75° C., 6.9 parts of potassium hydroxide in 40 parts of water are added over a 2-3 minute period. The color of the reactants changes from bluish white to pale cream. After 3 hours at 60° C., the reactants are cooled to room temperature and are acidified to a pH of 3 with dilute aqueous hydrochloric acid. The reactants are then filtered and washed thoroughly with water. After drying, 15 parts of polymer are recovered. Infrared analysis indicates substantially that about half of the acetoxy groups are hydrolyzed to phenolic groups.

EXAMPLE 3

Using the same procedure described in Example 1, 20 parts of 4-acetoxystyrene monomer are emulsion polymerized in 55 parts of water using 0.5 part of sodium lauryl sulfate and, as catalyst, 0.5 part of potassium persulfate in 5 parts of water. After 3 hours of heating at 75° C., the polymerization reaction is complete. Ammonium hydroxide, 28 percent $NH_3$ in water, 17 parts, is then added slowly to the reaction mixture. The color changes from white to off white. After heating for 2.5 hours at 75° C., the reaction mixture is cooled to room temperature and is acidified to a pH of 2.5 using a dilute aqueous solution of hydrochloric acid. The product is then filtered and washed thoroughly producing 15 parts of polymer. Infrared analysis indicates substantially complete hydrolysis of acetoxy group to phenolic group.

EXAMPLE 4

Using the same procedure described in Example 1, 10 parts of 4-acetoxystyrene and 10 parts of styrene monomer are emulsion polymerized in 55 parts of deionized water and 0.5 part of sodium lauryl sulfate using, as catalyst, a solution of 0.5 part of potassium persulfate in 5 parts of water. After 4 hours of heating at 75° C., the polymerization reaction is complete. A solution of 4.8 parts of sodium hydroxide in 10 parts of water is then added and heating is continued for 4 hours. The reaction mixture is then cooled to room temperature and is acidified to a pH of 2.5 using a dilute solution of hydrochloric acid. The reactants are filtered and 14 parts of a copolymer of vinylphenol and styrene are recovered.

EXAMPLE 5

To a suitable reactor are added 580 parts of deionized water and 5.3 parts of sodium lauryl sulfate. Agitation is begun and the temperature is adjusted to 74° C. A mixture of 211.5 parts of 4-acetoxystyrene, 58.5 parts of styrene and 13.3 parts of tertiary dodecyl mercaptan is added. The temperature is adjusted to 75° C. and 0.67 part of potassium sulfate in 14.6 parts of water is slowly added. The temperature is then held at 75°-80° C. for 2.5 hours to complete the polymerization reaction. The molecular weight of the copolymer is $M_w$ of 7,950 and $M_n$ of 2,760.

At the end of the heating period, the heat source is removed and 115 parts of sodium hydroxide dissolved in 780 parts of water are slowly added. When about one half of the solution has been added, an additional 50 parts of water are added along with the remainder of the caustic solution. The reactants are stirred at room temperature for 16 hours and 4 hours at 75° C. At the end of this time period, a substantially clear solution is obtained. To the solution are added 100 parts of acetic acid and 500 parts of water. The reactants are then heated for one and one half hours at 60° C. The finely divided polymer which precipitates from the solution is removed by filtration and is dried. The polymer has a $T_g$ of 136° C.

EXAMPLE 6

Using the same procedure described in the preceding examples, 22.34 parts of 4-acetoxystyrene and 17.72 parts of n-butyl acrylate plus 1.4 parts of tertiary dodecyl mercaptan are polymerized in 110.2 parts of water containing one part of sodium lauryl sulfate using as catalyst 0.1 part of potassium sulfate in 10 parts of water. The resulting polymer is reacted with 11 parts of sodium hydroxide dissolved in 110 parts of water to hydrolyze the acetoxy groups to phenol groups. The resulting copolymer is recovered by precipitating the polymer from the solution using 8.27 parts of acetic acid dissolved in 50 parts of water. The copolymer had a Tg of 89.5° C.

EXAMPLE 7

Using the same procedure described in the preceding examples, 24.75 parts of 4-acetoxystyrene and 15.34 parts of methyl methacrylate plus 1.4 parts of tertiary dodecyl mercaptan are polymerized in 110 parts of water containing one part of sodium lauryl sulfate using as catalyst 0.1 part of potassium sulfate. When the polymerization is completed, the polymer is reacted with 114 parts of a 10 percent solution of sodium hydroxide in water to hydrolyze the acetoxy groups. The hydrolyzed polymer is precipitated from solution using 9.4 parts of acetic acid dissolved in 50 parts of water. The Tg of the copolymer before hydrolysis was 102.9° C. After hydrolysis, the Tg was 152° C.

EXAMPLE 8

Using the same procedure described in the preceding examples, 18.7 parts of 4-acetoxystyrene and 21.3 parts of 2-ethylhexyl acrylate plus 1.4 parts of tertiary dodecyl mercaptan are polymerized in 110 parts of water containing one part of sodium lauryl sulfate using as catalyst 0.1 part of potassium sulfate. When the polymerization is completed, the polymer is reacted with 92 parts of a 10 percent solution of sodium hydroxide in water to hydrolyze the acetoxy groups. When the hydrolysis is completed, the polymer is precipitated with 6.9 parts of acetic acid in 50 parts of water. The precipitated polymer is filtered and dried.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A process for preparing polymers of p-vinylphenol which comprises:
   (a) emulsion polymerizing 4-acetoxystyrene monomer in water and, without isolating the polymer,
   (b) hydrolyzing the acetoxy groups to phenolic groups with a base.

2. The process of claim 1 wherein the emulsion polymerization is conducted at a monomer content in water of about 20 to about 60 weight percent at a temperature of about 30° C. to about 95° C.

3. The process of claim 1 wherein the 4-acetoxystyrene monomer is copolymerized with a monomer copolymerizable therewith.

4. The process of claim 3 wherein the copolymerizable monomer is styrene.

5. The process of claim 3 wherein the copolymerizable monomer is methyl methacrylate.

6. The process of claim 3 wherein the copolymerizable monomer is butyl acrylate.

7. The process of claim 3 wherein the copolymerizable monomer is 2-ethylhexyl acrylate.

8. The process of claim 1 wherein the base is an alkali metal hydroxide.

9. The process of claim 8 wherein the base is sodium hydroxide.

10. The process of claim 8 wherein the base is potassium hydroxide.

11. The process of claim 1 wherein the base is ammonium hydroxide.

12. The process of claim 1 wherein the hydrolysis reaction is conducted at a temperature of about 30° C. to about 95° C.

13. The process of claim 1 wherein the base is added in the amount of about 2 molar equivalents for each equivalent of acetoxy group that is to be hydrolyzed.

14. The process of claim 13 wherein the base is an alkali metal hydroxide.

15. The process of claim 13 wherein the base is ammonium hydroxide.

* * * * *